United States Patent
VanAusdall

(10) Patent No.: US 9,314,395 B1
(45) Date of Patent: Apr. 19, 2016

(54) WRAP AROUND WALKING AID

(71) Applicant: Jack Paul VanAusdall, Loveland, CO (US)

(72) Inventor: Jack Paul VanAusdall, Loveland, CO (US)

(*) Notice: Subject to any disclaimer, the term of this patent is extended or adjusted under 35 U.S.C. 154(b) by 0 days.

(21) Appl. No.: 14/532,448

(22) Filed: Nov. 4, 2014

(51) Int. Cl.
 *B62B 3/00* (2006.01)
 *A61H 3/04* (2006.01)
 *A61H 3/00* (2006.01)

(52) U.S. Cl.
 CPC ............ *A61H 3/04* (2013.01); *A61H 2003/006* (2013.01); *A61H 2003/046* (2013.01)

(58) Field of Classification Search
 CPC ..... A61H 3/04; A61H 3/00; A61H 2003/046; A61H 2003/006; A61H 2201/0161
 See application file for complete search history.

(56) References Cited

U.S. PATENT DOCUMENTS

| | | | | | |
|---|---|---|---|---|---|
| 2,362,466 | A | * | 11/1944 | Carter | A61H 3/04 135/67 |
| 4,748,994 | A | * | 6/1988 | Schultz | A61H 3/04 135/67 |
| 5,499,856 | A | * | 3/1996 | Sorrell | A61H 3/04 135/66 |
| 5,605,169 | A | * | 2/1997 | Light | A61H 3/04 135/66 |
| 5,702,326 | A | * | 12/1997 | Renteria | A61H 3/04 135/67 |
| 5,741,020 | A | * | 4/1998 | Harroun | A61H 3/04 280/42 |
| 6,733,018 | B2 | * | 5/2004 | Razon | A61H 3/008 135/67 |
| 7,669,863 | B2 | * | 3/2010 | Steiner | A61G 5/14 280/250.1 |
| 8,061,376 | B2 | * | 11/2011 | Ryan | A61H 3/04 135/67 |
| 8,251,079 | B1 | * | 8/2012 | Lutz | A61H 3/04 135/67 |
| 8,468,622 | B2 | * | 6/2013 | Purwar | A61G 7/1017 297/5 |
| 8,584,689 | B2 | * | 11/2013 | Catton | A61H 3/04 135/67 |
| 8,708,363 | B1 | * | 4/2014 | Chang | A61H 3/04 135/67 |
| 9,149,408 | B2 | * | 10/2015 | Karlovich | |
| 9,180,066 | B2 | * | 11/2015 | Izard et al. | |

* cited by examiner

Primary Examiner — James M Dolak
(74) Attorney, Agent, or Firm — Plager Schack LLP

(57) ABSTRACT

A wrap around walking aid is configured to assist a human user in walking. The wrap around walking aid comprising has a first rear lower frame and a first front lower frame mechanically coupled to a first upper frame. A back rest is connected to the first rear lower frame. A second rear lower frame and a second front lower frame are mechanically coupled to a second upper frame. The second rear lower frame is further mechanically coupled to the back rest. At least one first fixed front wheel is mechanically coupled to both front lower frames. At least one first castor rear wheel is mechanically coupled to both rear lower frames. The wheels enable a turn radius while the human user is walking forward.

15 Claims, 4 Drawing Sheets

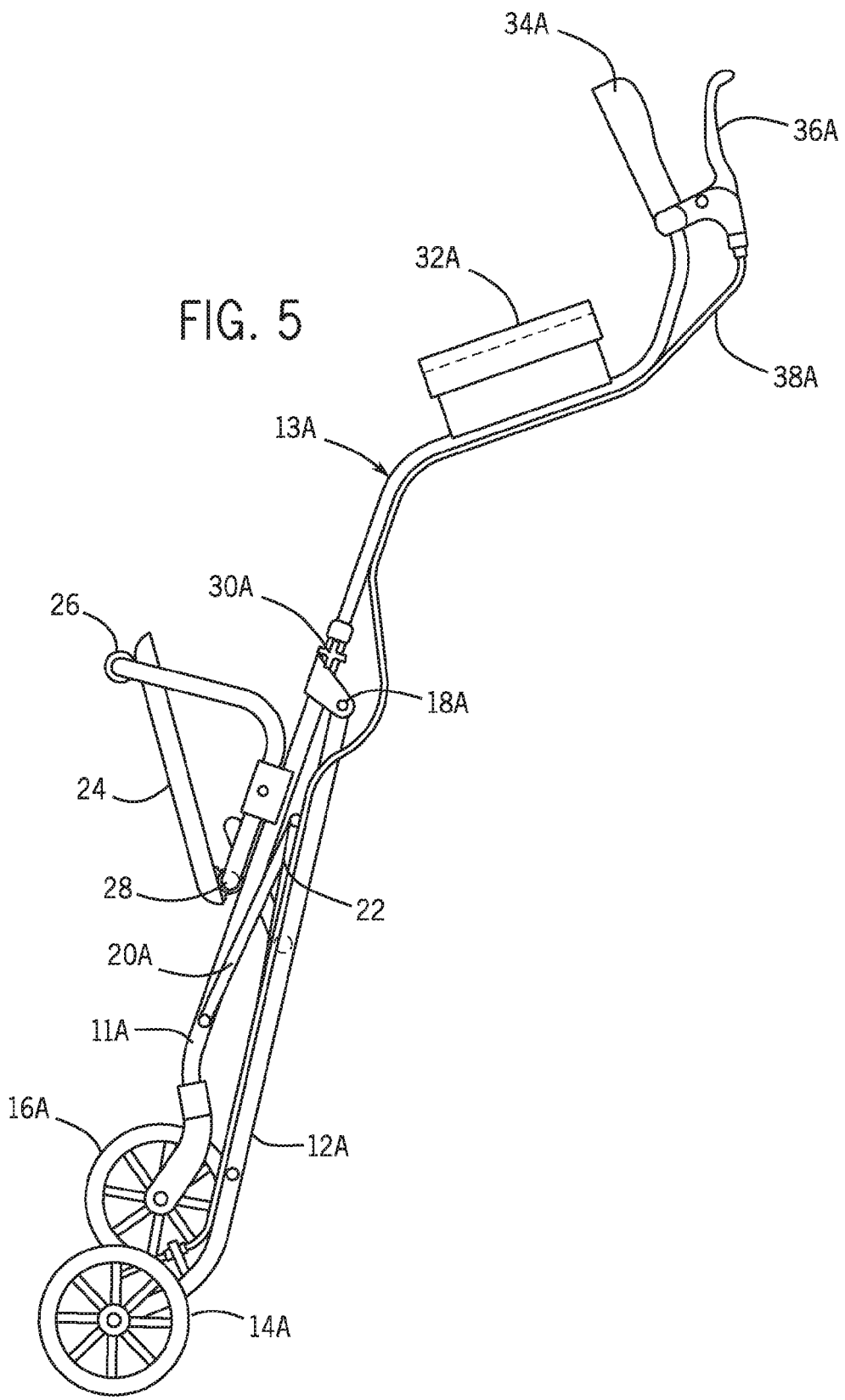

WRAP AROUND WALKING AID

BACKGROUND

The embodiments herein relate generally to devices that assist those with mobility difficulties.

Prior to embodiments of the disclosed invention, conventional walkers caused people to have a bent forward low back and neck in extension posture. This caused neck and back pain. They also had break handles that could cause the wrist to be bent in an abnormal way that can could wrist and elbow pain. Conventional walkers also inhibited a normal gait pattern. Embodiments of the disclosed invention solve these problems. Conventional walkers forward leaning posture has been shown to contribute to falls. With a more upright posture along with the forearm support of this embodiment this should reduce this problem.

SUMMARY

A wrap around walking aid is configured to assist a human user in walking. The wrap around walking aid can include a first rear lower frame and a first front lower frame mechanically coupled to a first upper frame. At least one first fixed front wheel can be mechanically coupled to the first front lower frame. At least one first castor rear wheel can be mechanically coupled to the first rear lower frame. A back rest can be connected to the first rear lower frame. A second rear lower frame and a second front lower frame can be mechanically coupled to a second upper frame. The second rear lower frame can be further mechanically coupled to the back rest. At least one second fixed front wheel can be mechanically coupled to the second front lower frame. At least one second castor rear wheel can be mechanically coupled to the second rear lower frame. The at least one first castor rear wheel, the at least one second castor rear wheel, the at least one first fixed front wheel and the at least one second fixed front wheel can enable a turn radius while the human user is walking forward.

In some embodiments, a first folding point can be arranged between the first front lower frame and the first rear lower frame. The first folding point can be configured to permit the first front lower frame to fold upon the first rear lower frame. A second folding point can be arranged between the second front lower frame and the second rear lower frame. The second folding point can be configured to permit the second front lower frame to fold upon the second rear lower frame.

In some embodiments, at least one first strut can be connected to the first rear lower frame and the first front lower frame. The at least one first strut can be configured to limit the first front lower frame moving away from the first rear lower frame. At least one second strut can be connected to the second rear lower frame and the second front lower frame. The at least one second strut can be configured to limit the second front lower frame moving away from the second rear lower frame.

In some embodiments, a seat rest can be mechanically coupled to the first front lower frame and the second front lower frame. A seat pivot can be attached to a seat and the back rest. Rotating the seat from the seat pivot can cause the seat to rest upon the seat rest.

In some embodiments, the first upper frame can further comprise a first telescoping segment, configured to extend from within the first rear lower frame and further configured to be tightened into place by a first height adjustment. The first telescoping segment can be on a first telescoping axis. A first forearm support segment can be joined to the first telescoping segment. The first forearm support segment can extend on a first forearm axis. Measured from the first telescoping segment, the first forearm support segment can be arranged at a first obtuse angle that is greater than 90 degrees. A first handle segment can be joined to the first forearm support segment.

In some embodiments, a first handle can be mechanically coupled to the first handle segment. A first hand brake can be mechanically coupled to the first handle. A first brake cable can be connected to the first hand brake and the at least one first fixed front wheel. Squeezing the first hand brake can engage the first brake cable to stop motion of the at least one first fixed front wheel. In some embodiments, a first forearm rest can be mechanically coupled to the first forearm support segment.

In some embodiments, the second upper frame can further comprise a second telescoping segment, configured to extend from within the second rear lower frame and further configured to be tightened into place by a second height adjustment. The second telescoping segment can be on a second telescoping axis. A second forearm support segment can be joined to the second telescoping segment. The second forearm support segment can extend on a second forearm axis. Measured from the second telescoping segment, the second forearm support segment can be arranged at a second obtuse angle that is greater than 90 degrees. A second handle segment can be joined to the second forearm support segment.

In some embodiments, a second handle can be mechanically coupled to the second handle segment. A second hand brake can be mechanically coupled to the second handle. A second brake cable can be connected to the second hand brake and the at least one second fixed front wheel. Squeezing the second hand brake can engage the second brake cable to stop motion of the at least one second fixed front wheel. In some embodiments, a second forearm rest can be mechanically coupled to the second forearm support segment.

BRIEF DESCRIPTION OF THE FIGURES

The detailed description of some embodiments of the invention is made below with reference to the accompanying figures, wherein like numerals represent corresponding parts of the figures.

FIG. 5 is a side elevation view showing an embodiment of the invention in a storage mode.

DETAILED DESCRIPTION OF CERTAIN EMBODIMENTS

Figure 1:
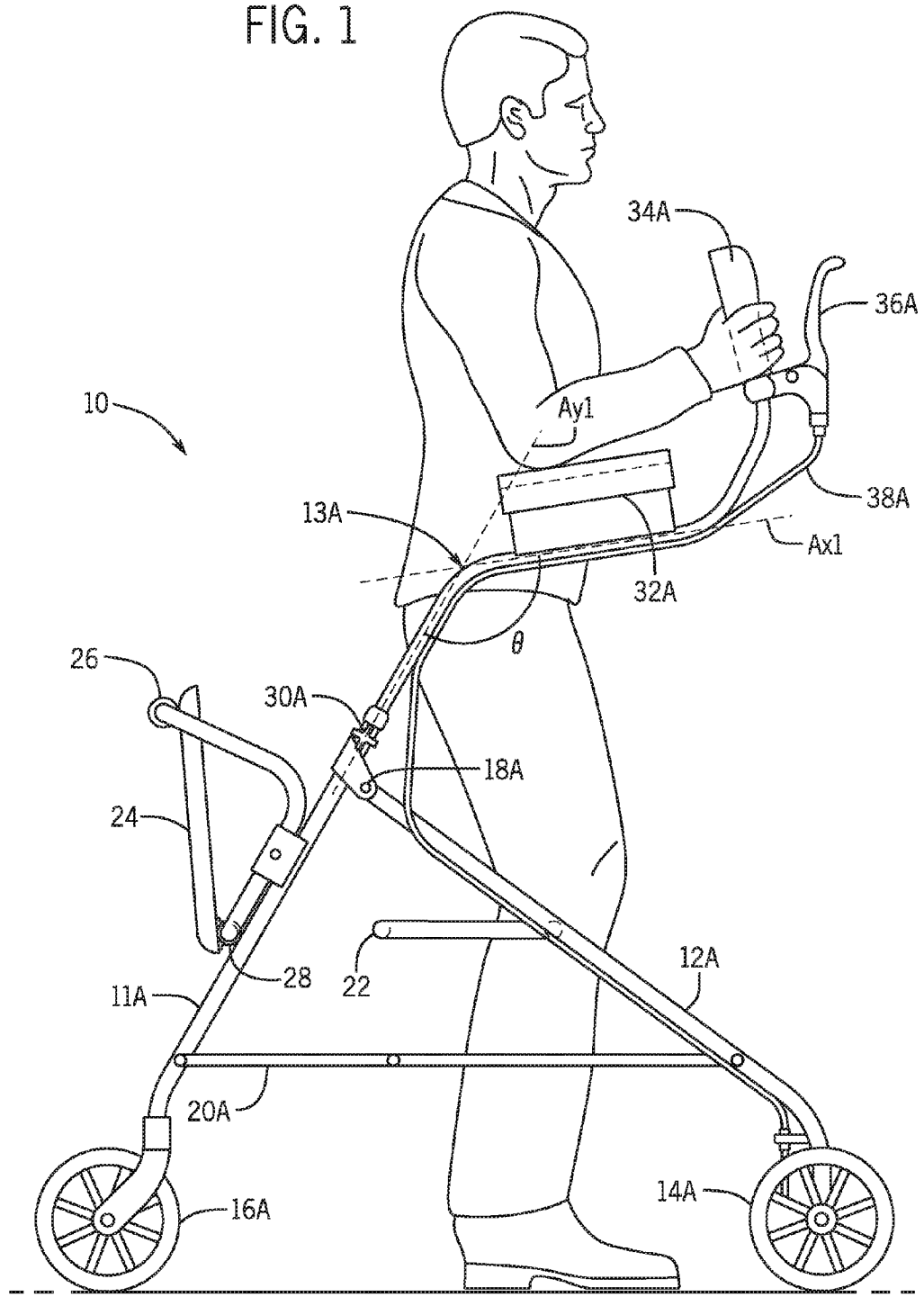
FIG. 1 is a side elevation view of an embodiment of the invention in use.
Figure 2:
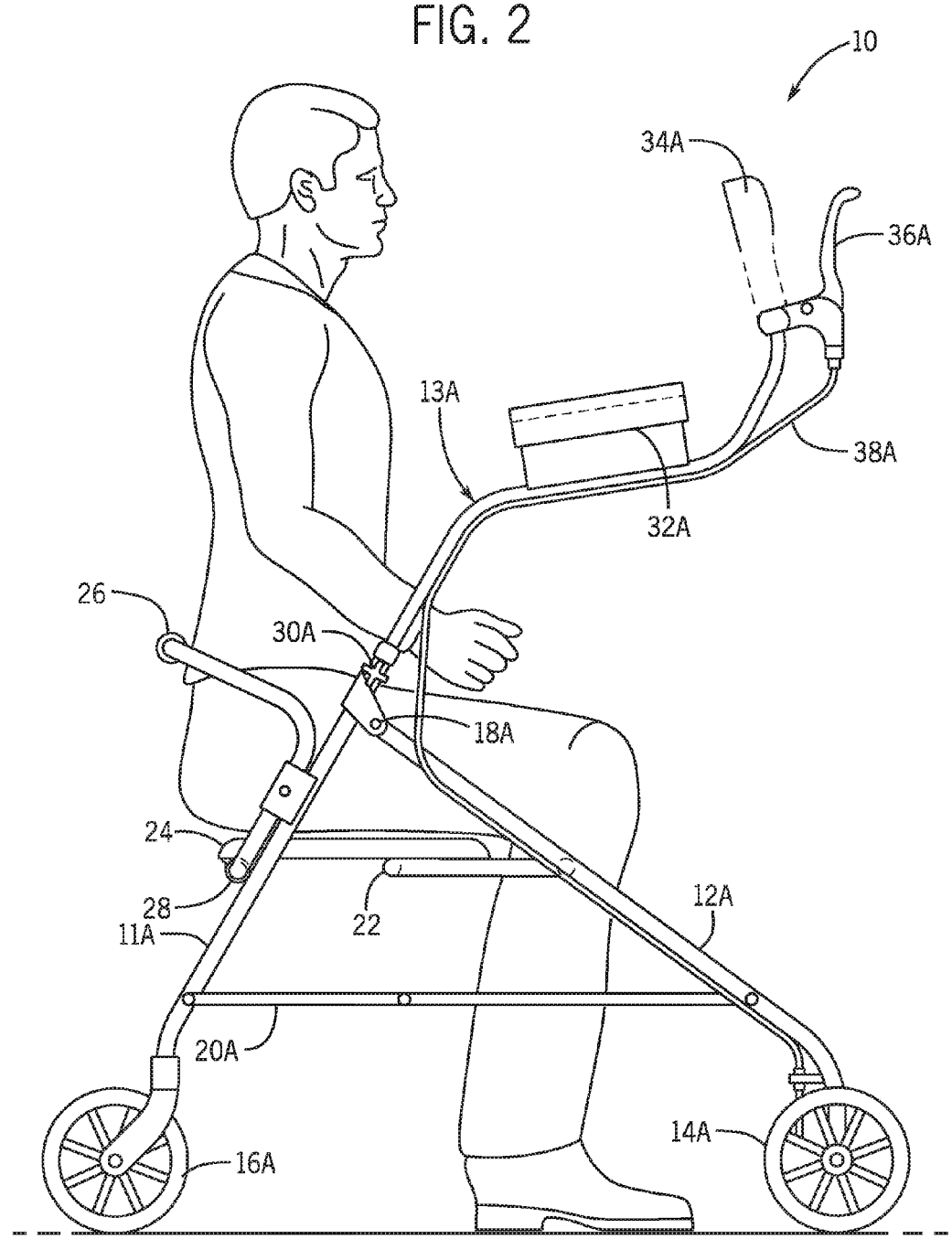
FIG. 2 is a side elevation view showing an embodiment of the invention used in a seating mode.

By way of example, and referring to FIG. 1, one embodiment of wrap-around walking aid 10 further comprises first rear lower frame 11A and first front lower frame 12A mechanically coupled to first upper frame 13A. First front lower frame 12A is further mechanically coupled to at least one first fixed front wheel 14A. First rear lower frame 11A is further mechanically coupled to at least one first castor rear wheel 16A. First front lower frame 12A is joined to first rear lower frame 11A at first folding point 18 which is configured to permit first front lower frame 12A to fold upon first rear lower frame 11A as shown in FIG. 5. First rear lower frame 11A is further connected to first front lower frame 12A with at least one first strut 20A. The at least one first strut 20A limits the distance the first front lower frame 12A can move away from first rear lower frame 11A.

First front lower frame 12A is mechanically coupled to seat rest 22 which partially extends between first front lower frame 12A and first rear lower frame 11A. Seat 24 and back rest 26 are attached to seat pivot 28. Back rest 26 is connected to first rear lower frame 11A.

First upper frame 13A has three segments, a first telescoping segment 15A that extends from first rear lower frame 11A and can be tightened into place by first height adjustment 30A. In some embodiments, this could be a quick release height adjustment. The first telescoping segment 15A bends into the first forearm support segment 17A. The first forearm support segment 17A extends on a first forearm axis Ax1 whereas the first telescoping segment 15A is on a first telescoping axis Ay1. Measured from the first telescoping segment 15A the first forearm segment 17A is arranged at a first obtuse angle θ1 that is greater than 90 degrees. First obtuse angle θ1 brings the torso of a human user back slightly to create a more upright posture reducing neck and back pain.

The first forearm support segment is mechanically coupled to first forearm rest 32A. The first forearm support segment bends into a first handle segment. The first handle segment is mechanically coupled to first handle 34A. First handle 34A is further mechanically coupled to first hand brake 36A. First hand brake 36A can be squeezed toward first handle 34A to engage first brake cable 38A. First brake cable 38A is mechanically coupled to at least one first fixed front wheel 14A.

Figure 3:
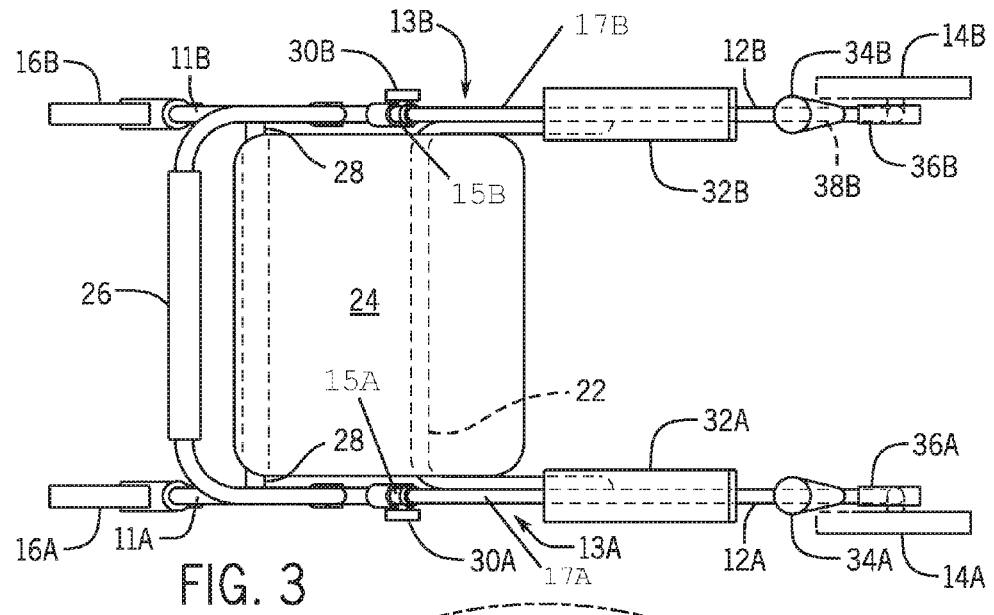
FIG. 3 is a top plan view of an embodiment of the invention.

FIG. 3 illustrates that some parts can exist in multiple quantities. For instance, one embodiment of wrap-around walking aid 10 further comprises second rear lower frame 11B and second front lower frame 12B mechanically coupled to second upper frame 13B. Second front lower frame 12B is further mechanically coupled to at least one second fixed front wheel 14B. Second rear lower frame 11B is further mechanically coupled to at least one second castor rear wheel 16B. Second front lower frame 12B is joined to second rear lower frame 11B at second folding point 18B which is configured to permit second front lower frame 12B to fold upon second rear lower frame 11B as shown in FIG. 5. Second rear lower frame 11B is further connected to second front lower frame 12B with at least one second strut 20B. The at least one second struts 20B limits the distance the second front lower frame 12B can move away from second rear lower frame 11B.

Figure 4:
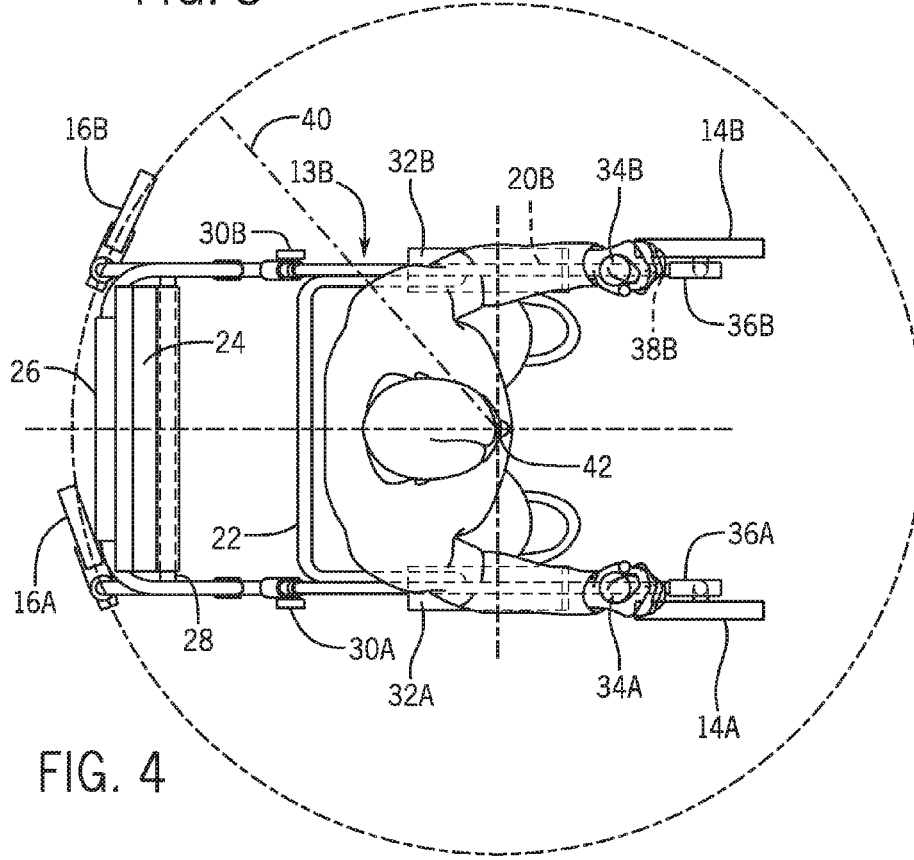
FIG. 4 is a top plan view of an embodiment of the invention with a user.

Second front lower frame 12B is mechanically coupled to seat rest 22 which partially extends between second front lower frame 12B and second rear lower frame 11B. Seat 24 and back rest 26 are attached to seat pivot 28. Back rest 26 is connected to second rear lower frame 11B. Note that contrary to conventional walkers, as shown in FIG. 3 and FIG. 4, there is no support member forward of seat 24 when deployed. This removes a common problem in conventional walkers—the human user banging legs and knees on forward supports.

Second upper frame 13B has three segments, a second telescoping segment 15B that extends from second rear lower frame 11B and can be tightened into place by second height adjustment 30B. In some embodiments, this could be a quick release height adjustment. The second telescoping segment 15B bends into the second forearm support segment 17B. The second forearm support segment 17B extends on a second forearm axis whereas the second telescoping segment 15B is on a second telescoping axis. Measured from the second telescoping segment the second forearm segment is arranged at a second obtuse angle that is greater than 90 degrees. The second obtuse angle brings the torso of a human user back slightly to create a more upright posture reducing neck and back pain.

The second forearm support segment is mechanically coupled to second forearm rest 32B. The second forearm support segment bends into a second handle segment. The second handle segment is mechanically coupled to second handle 34B. Second handle 34B is further mechanically coupled to second hand brake 36B. Second hand brake 36B can be squeezed toward second handle 34B to engage second brake cable 38B. Second brake cable 38B is mechanically coupled to at least one second fixed front wheel 14B.

Further, as shown in FIG. 4, wrap-around walking aid 10 can be scaled to accommodate any size human user. The human user's nose is approximately in the position of center of rotation 42 of at least one first castor rear wheel 16A and at least one second castor rear wheel 16B creating turn radius 40. This enables a user to easily turn wrap-around walking aid 10 while moving forward. Turn radius 40 is very tight, in some cases as wide as wrap-around walking aid 10.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A wrap around walking aid, that assists a human user in walking; the wrap around walking aid comprising:
    a first rear lower frame and a first front lower frame mechanically coupled to a first upper frame;
        at least one first fixed front wheel mechanically coupled to the first front lower frame;
        at least one first castor rear wheel mechanically coupled to the first rear lower frame;
        a first telescoping segment, extending from within the first rear lower frame and tightened into place by a first height adjustment; wherein the first telescoping segment is on a first telescoping axis; and
        a first forearm support segment joined to the first telescoping segment; wherein the first forearm support segment extends on a first forearm axis; wherein measured from the first telescoping segment, the first forearm support segment is arranged at a first obtuse angle that is greater than 90 degrees;
        a first handle segment joined to the first forearm support segment;
    a back rest, connected to the first rear lower frame
    a second rear lower frame and a second front lower frame mechanically coupled to a second upper frame; wherein the second rear lower frame is further mechanically coupled to the back rest;
        at least one second fixed front wheel mechanically coupled to the second front lower frame;
        at least one second castor rear wheel mechanically coupled to the second rear lower frame;
    wherein the at least one first castor rear wheel, the at least one second castor rear wheel, the at least one first fixed front wheel and the at least one second fixed front wheel enable a turn radius while the human user is walking forward.

2. The wrap around walking aid of claim 1, further comprising:
    a first folding point arranged between the first front lower frame and the first rear lower frame; wherein the first folding point permits the first front lower frame to fold upon the first rear lower frame; and
a second folding point arranged between the second front lower frame and the second rear lower frame; wherein the second folding point permits the second front lower frame to fold upon the second rear lower frame.

3. The wrap around walking aid of claim 2, further comprising:
at least one first strut connected to the first rear lower frame and the first front lower frame; wherein the at least one first strut limits the first front lower frame moving away from the first rear lower frame; and
at least one second strut connected to the second rear lower frame and the second front lower frame; wherein the at least one second strut limits the second front lower frame moving away from the second rear lower frame.

4. The wrap around walking aid of claim 3, further comprising:
a seat rest mechanically coupled to the first front lower frame and the second front lower frame; and
a seat pivot attached to a seat and the back rest;
wherein rotating the seat from the seat pivot causes the seat to rest upon the seat rest.

5. The wrap around walking aid of claim 4, further comprising:
a first handle mechanically coupled to the first handle segment;
a first hand brake mechanically coupled to the first handle; and
a first brake cable connected to the first hand brake and the at least one first fixed front wheel;
wherein squeezing the first hand brake engages the first brake cable to stop motion of the at least one first fixed front wheel.

6. The wrap around walking aid of claim 5, further comprising: a first forearm rest mechanically coupled to the first forearm support segment.

7. The wrap around walking aid of claim 6, wherein the second upper frame further comprises:
a second telescoping segment, extends from within the second rear lower frame and is tightened into place by a second height adjustment; wherein the second telescoping segment is on a second telescoping axis;
a second forearm support segment joined to the second telescoping segment; wherein the second forearm support segment extends on a second forearm axis; wherein measured from the second telescoping segment, the second forearm support segment is arranged at a second obtuse angle that is greater than 90 degrees; and
a second handle segment joined to the second forearm support segment.

8. The wrap around walking aid of claim 7, further comprising:
a second handle mechanically coupled to the second handle segment;
a second hand brake mechanically coupled to the second handle; and
a second brake cable connected to the second hand brake and the at least one second fixed front wheel;
wherein squeezing the second hand brake engages the second brake cable to stop motion of the at least one second fixed front wheel.

9. The wrap around walking aid of claim 8, further comprising: a second forearm rest mechanically coupled to the second forearm support segment.

10. A wrap around walking aid, which assists a human user in walking; the wrap around walking aid comprising:
a first rear lower frame and a first front lower frame mechanically coupled to a first upper frame;
at least one first fixed front wheel mechanically coupled to the first front lower frame;
at least one first castor rear wheel mechanically coupled to the first rear lower frame;
a first telescoping segment, extending from within the first rear lower frame and tightened into place by a first height adjustment; wherein the first telescoping segment is on a first telescoping axis; and
a first forearm support segment joined to the first telescoping segment; wherein the first forearm support segment extends on a first forearm axis; wherein measured from the first telescoping segment, the first forearm support segment is arranged at a first obtuse angle that is greater than 90 degrees;
a first handle segment joined to the first forearm support segment;
a first folding point arranged between the first front lower frame and the first rear lower frame; wherein the first folding point permits the first front lower frame to fold upon the first rear lower frame;
at least one first strut connected to the first rear lower frame and the first front lower frame; wherein the at least one first strut limits the first front lower frame moving away from the first rear lower frame;
a back rest, connected to the first rear lower frame;
a second rear lower frame and a second front lower frame mechanically coupled to a second upper frame; wherein the second rear lower frame is further mechanically coupled to the back rest;
at least one second fixed front wheel mechanically coupled to the second front lower frame;
at least one second castor rear wheel mechanically coupled to the second rear lower frame;
a second folding point arranged between the second front lower frame and the second rear lower frame; wherein the second folding point permits the second front lower frame to fold upon the second rear lower frame
at least one second strut connected to the second rear lower frame and the second front lower frame; wherein the at least one second strut limits the second front lower frame moving away from the second rear lower frame;
wherein the at least one first castor rear wheel, the at least one second castor rear wheel, the at least one first fixed front wheel and the at least one second fixed front wheel enable a turn radius while the human user is walking forward
a seat rest mechanically coupled to the first front lower frame and the second front lower frame;
a seat pivot attached to a seat and the back rest;
wherein rotating the seat from the seat pivot causes the seat to rest upon the seat rest.

11. The wrap around walking aid of claim 10, further comprising:
a first handle mechanically coupled to the first handle segment;
a first hand brake mechanically coupled to the first handle; and
a first brake cable connected to the first hand brake and the at least one first fixed front wheel;
wherein squeezing the first hand brake engages the first brake cable to stop motion of the at least one first fixed front wheel.

12. The wrap around walking aid of claim 11, further comprising: a first forearm rest mechanically coupled to the first forearm support segment.

13. The wrap around walking aid of claim 12, wherein the second upper frame further comprises:
- a second telescoping segment, extends from within the second rear lower frame and is tightened into place by a second height adjustment; wherein the second telescoping segment is on a second telescoping axis;
- a second forearm support segment joined to the second telescoping segment; wherein the second forearm support segment extends on a second forearm axis; wherein measured from the second telescoping segment, the second forearm support segment is arranged at a second obtuse angle that is greater than 90 degrees; and
- a second handle segment joined to the second forearm support segment.

14. The wrap around walking aid of claim 13, further comprising:
- a second handle mechanically coupled to the second handle segment;
- a second hand brake mechanically coupled to the second handle; and
- a second brake cable connected to the second hand brake and the at least one second fixed front wheel;
- wherein squeezing the second hand brake engages the second brake cable to stop motion of the at least one second fixed front wheel.

15. The wrap around walking aid of claim 14, further comprising: a second forearm rest mechanically coupled to the second forearm support segment.

* * * * *